July 8, 1924.

A. J. LAVOIE

1,500,588

POWER TRANSMISSION

Filed Jan. 4, 1922    9 Sheets-Sheet 3

INVENTOR
A. J. Lavoie
BY E. J. Hetherstonhaugh
ATTORNEY

July 8, 1924.

A. J. LAVOIE 1,500,588

POWER TRANSMISSION

Filed Jan. 4, 1922

INVENTOR
A. J. Lavoie
BY Fetherstonhaugh
ATTORNEY

July 8, 1924.

A. J. LAVOIE 1,500,588

POWER TRANSMISSION

Filed Jan. 4, 1922  9 Sheets-Sheet 9

INVENTOR
A. J. Lavoie
BY J. Fetherstonhaugh
ATTORNEY

Patented July 8, 1924.

1,500,588

UNITED STATES PATENT OFFICE.

ALPHONSE JOSEPH LAVOIE, OF MONTREAL, QUEBEC, CANADA.

POWER TRANSMISSION.

Application filed January 4, 1922. Serial No. 526,957.

*To all whom it may concern:*

Be it known that I, ALPHONSE JOSEPH LAVOIE, a subject of the King of Great Britain, and residing at the city of Montreal, in the Province of Quebec, in the Dominion of Canada, have invented a new and useful Power Transmission, of which the following is the specification.

The invention relates to improvements in power transmission as described in the present specification and illustrated in the accompanying drawings that form part of the same.

The invention consists essentially of the novel features of construction pointed out broadly and specifically in the claims for novelty following a description in detail of the preferred form of the invention.

The objects of the invention are to facilitate the transmission of power to an auxiliary drive particularly useful in motor cars where it is necessary to change from a direct drive to a drive through gear mechanisms for hill climbing and other purposes; to simplify the gear mechanisms and eliminate the wear and tear on the gears due to engagement and disengagement; to effect an instantaneous change over following the release of the clutch in the direct drive to insure safety and furnish a good service mechanism; and generally to provide a transmission of a durable nature comparatively economical to construct and maintain and very efficient in operation.

Like numerals of reference indicate corresponding parts in the various figures.

Figure 1:
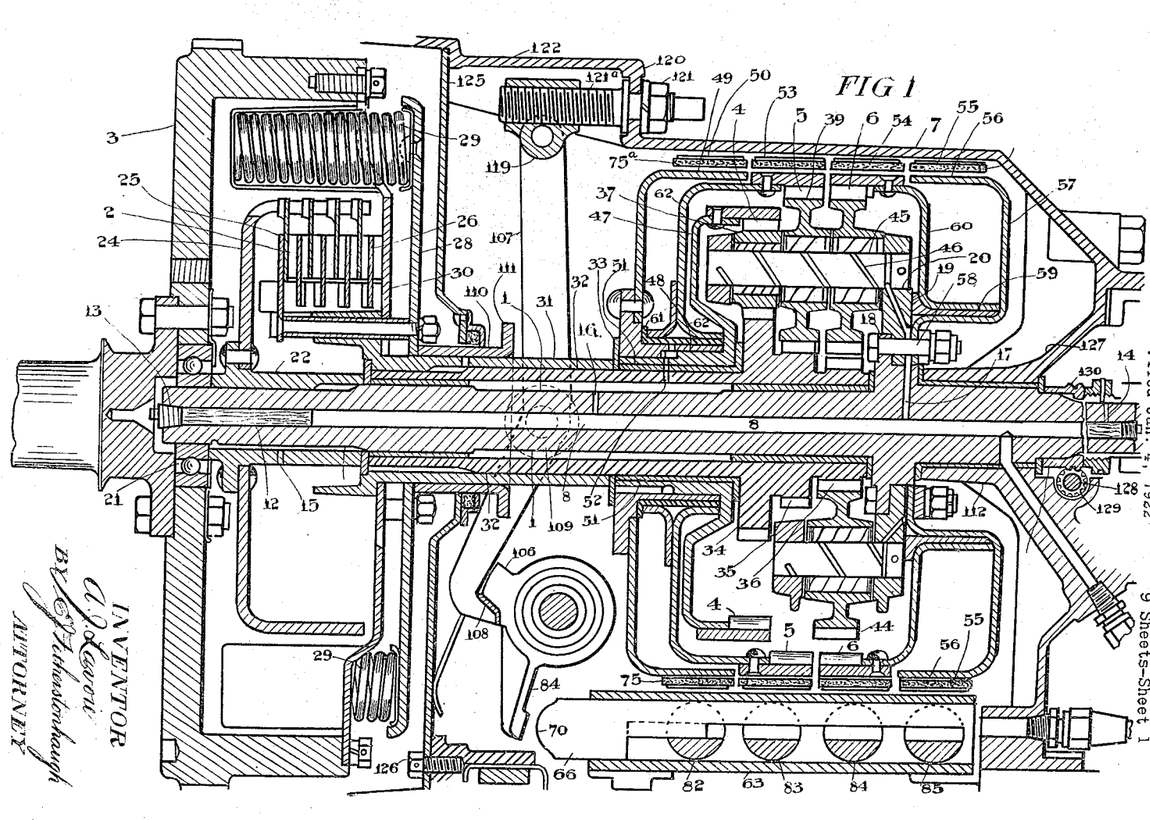
Figure 1 is a longitudinal sectional view through the transmission case disclosing the working parts.

Referring to the drawings, the transmission shaft 1 is operated directly from the clutch 2 in the fly wheel 3 and also by means of the internal gears 4, 5 and 6 enclosed in a gear case 7.

The transmission shaft is hollow to form a longitudinal oil chamber 8 connected with an oil feed pump 9 through passages 10 and 11 the ends of said shaft being closed by the absorbent plugs 12 and screw plugs 13, the oil discharge passages 14 and 15 leading from the area of said absorbent.

Intermediately the oil discharge passages 16 and 17 lead from the oil chamber 8, the passage 16 oiling the outer surface of the shaft 1, so that it may turn readily within its sleeves and the passages 17 leading through the annular flange 18 from the shaft and through the spider 19 to the shaft bearing 20 in said spider.

The shaft is journalled at its inner end in the bearings 21 introduced in the centre of the fly wheel 3 and is splined in the hub 22 of the clutch 2, which is formed of the flanged disc 24, outer plates 25 and inner plates 26, the latter being held by the bolts 27 to the sliding plate 28 held by the springs 29. The fixed plate 30 is rigidly secured to the fly wheel 3 and forms the back against which the plates are drawn together by the springs 29, otherwise when the springs are compressed the plates are loose and the clutch consequently released.

The fixed plate 30 is rigid with the sleeve 31 which extends along and encircles the gear sleeve shaft 32 and is splined thereto, said sleeve 31 being separated from the hub 22 by the washer 33.

Figures 10, 12, 14:
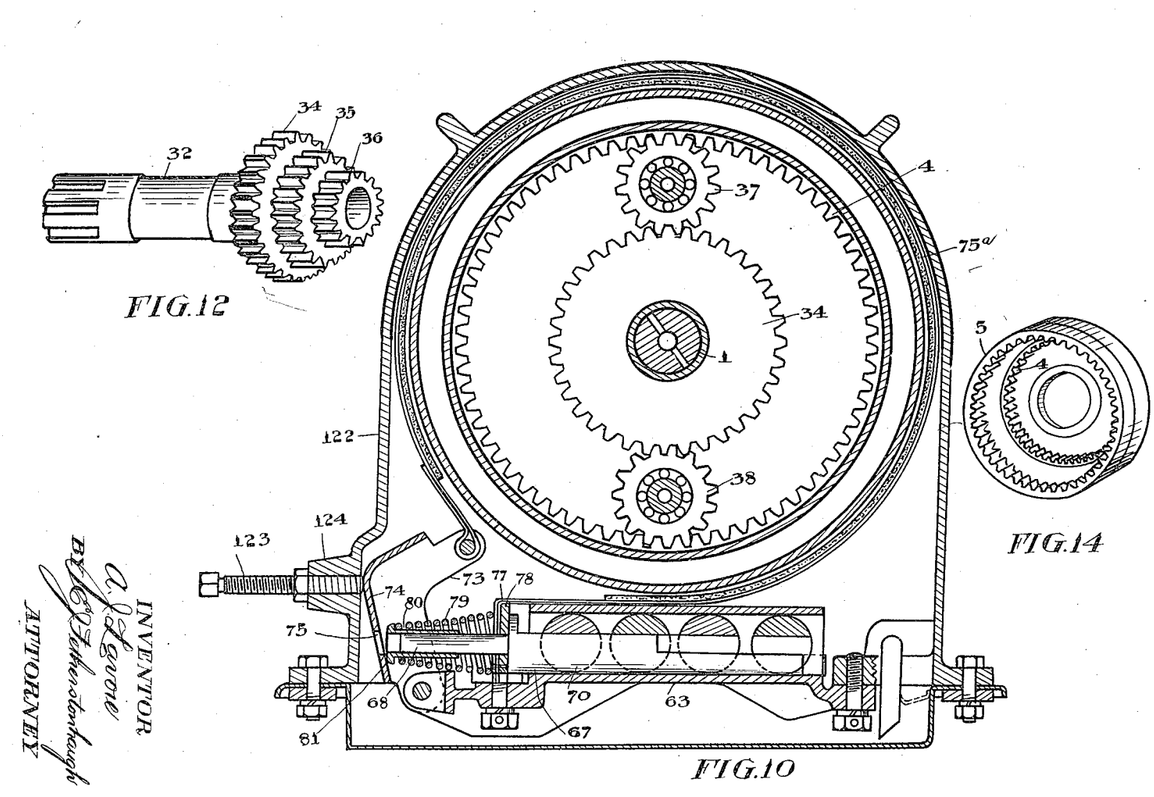
Figure 10 is a cross sectional view of the transmission case showing an elevation of the second speed gear drive.
Figure 12 is a perspective detail, of the gear sleeve shaft and central gears in the gear drive.
Figure 14 is a perspective detail of the two other internal gears.

The gear sleeve shaft 32 terminates at its outer end in the three central gears 34, 35 and 36 of different diameters which are in alignment with the internal gears 4, 5 and 6 respectively.

It will be thus seen that from the engine shaft through the fly wheel and sleeves 31 and 32, there is a constant connection so that these sleeves operate continuously while the engine is in motion.

The largest central gear 34 coacts with the intermediate gears 37 and 38 forming the connecting members to the internal gear 4.

Figures 9, 13:
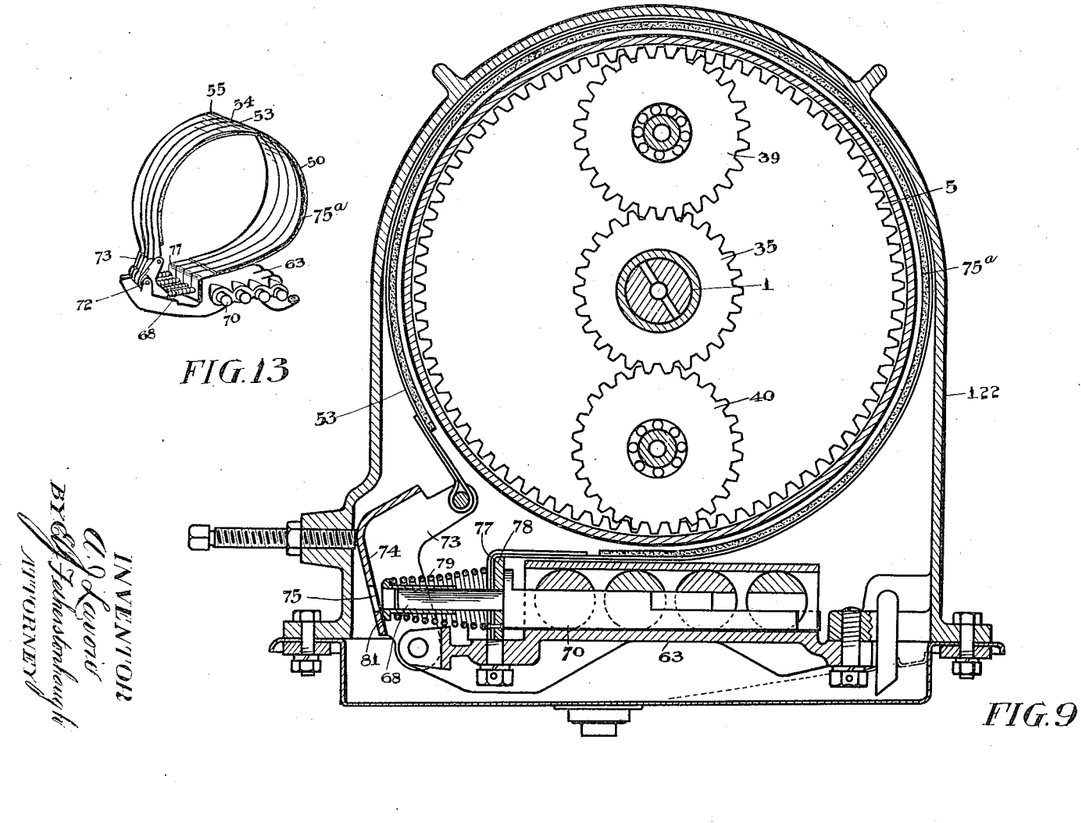
Figure 9 is a cross sectional view of the transmission case showing an elevation of the low speed gear drive.
Figure 13 is a perspective detail of the brake bands for the internal gears and service brake.

The next size central gear 35 coacts with the intermediate gears 39 and 40, which form the connection to the internal gear 5. This last connection is for the first speed, while the gears 4, 34, 37 and 38 form the connections for the second speed.

Figure 11:
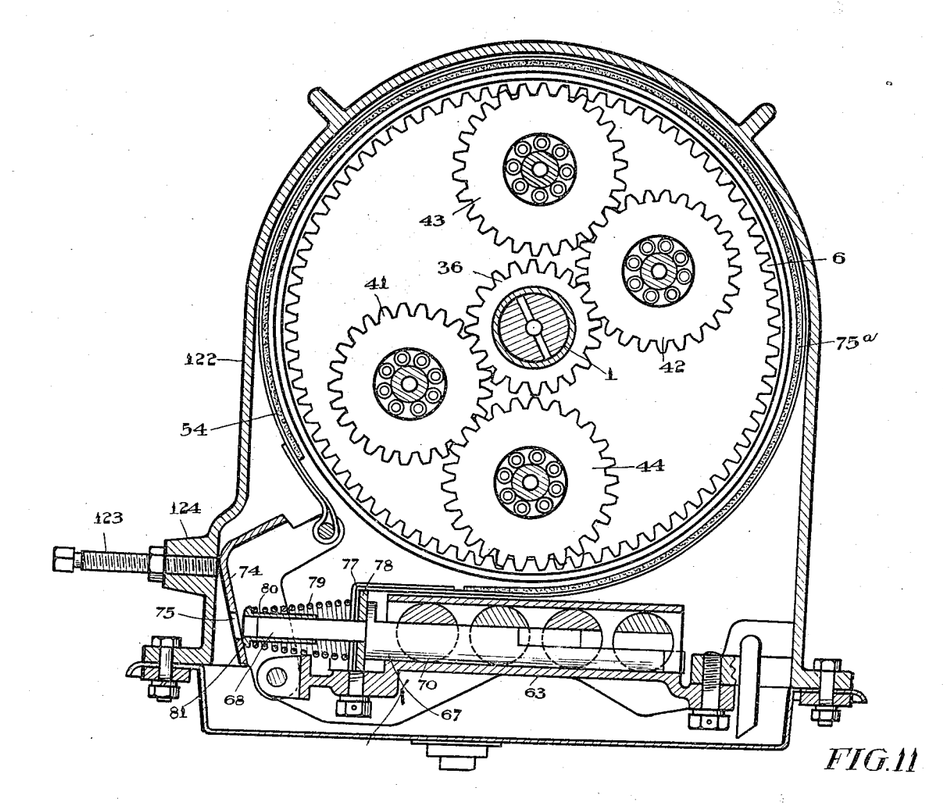
Figure 11 is a cross sectional view of the transmission case showing an elevation of the reverse gear drive.
Figure 15:
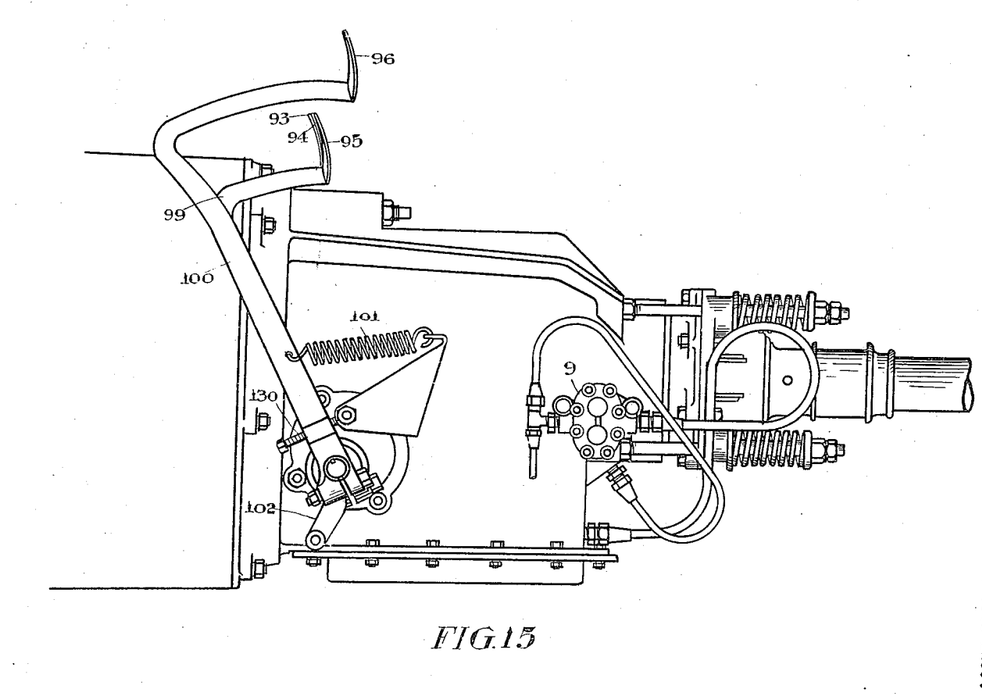
Figure 15 is a side elevation of the complete machine.

The third central gear 36 meshes with the intermediate gears 41 and 42 which in turn mesh with the intermediate gears 43 and 44 and the latter two mesh with the internal gear 6 for the reverse motion of the transmission shaft 1.

Figure 8:
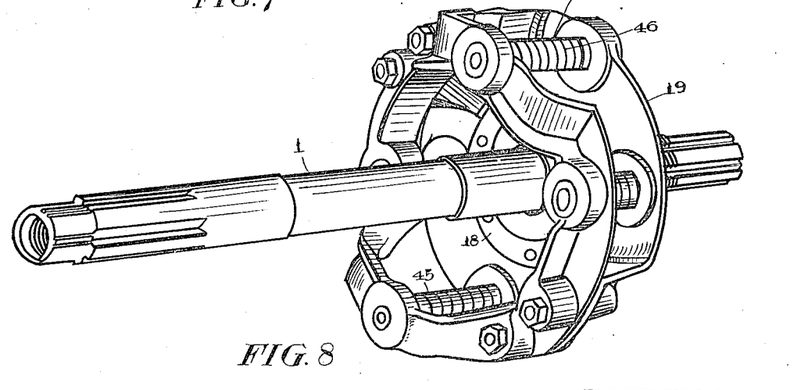
Figure 8 is a perspective detail of the transmission shaft and spider mounting for the intermediate gears.

The intermediate gears 37 to 44 inclusive are journalled on the several spider shafts 45 having the spiral oil grooves 46.

Figure 7:
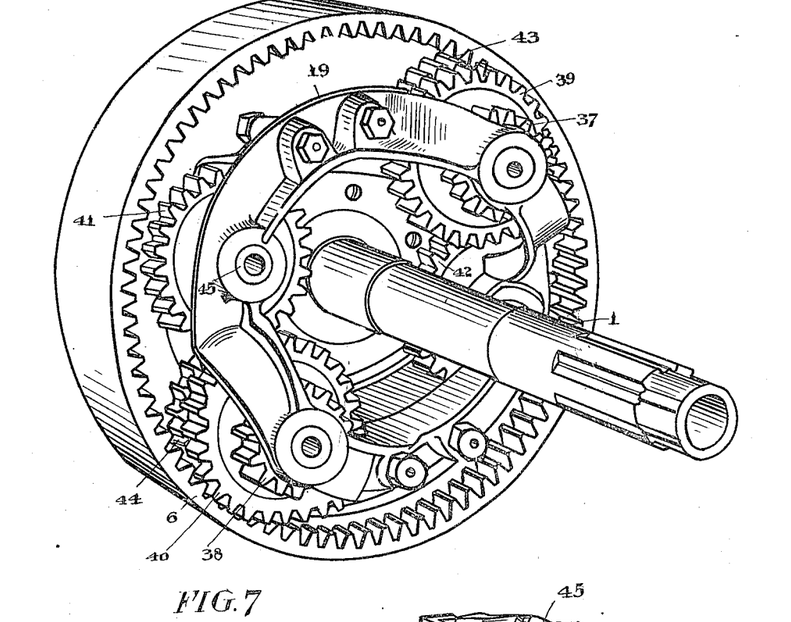
Figure 7 is a perspective detail of an internal gear, showing the transmission shaft, coacting gears and omitting the central operating gears.

The internal gear 4 is secured to or forms part with the web 47 and this web extends from a hub 48, from which extends the brake ring 49 in an offset direction under the band brake 50.

The hub 48 turns on the bushing 51 encircling the gear sleeve shaft 32 and this bearing is oiled through the passages 52 from the central oil chamber 8.

The periphery of the internal gear 5 forms the brake ring within the band brake 53; the periphery of the internal gear 6 forms the brake ring within the band brake 54; and the band brake 55 extends over the brake ring 56 which extends inwardly in the web 57 and is offset and secured by the bolts 58 to the spider 19 through the projecting portion of the flange 18 thereby forming a service brake.

The offset portion of the brake ring 56 is encircled by the bushing 59 which forms the bearing for the web 60 of the internal gear 6 and is oiled from the same central source. The hub 48 is encircled by the bushing 61 which forms a bearing for the extension of the web 62 from the internal gear 5, therefore all the internal gears turn freely and also the service brake ring 56 with the transmission shaft 1, so long as the bands remain loose and consequently the central and intermediate gears are free and there is no power between the said central gears and the said internal gears, simply idle rotation until one or other of the band brakes is tightened. This has the effect of holding the particular internal gear stationary and as the intermediate gears are driven by the particular central gear, the said intermediate gears will run around the stationary internal gear thereby driving the transmission shaft through the spider 13.

The service brake is similarly operated, that is to say the band is tightened and through the spider 19 the shaft 1 is held.

In the reverse gear the arrangement of the intermediate gears provides for the travel of the intermediate gears in the opposite direction, that is all the difference there is between the first and second speeds and the reverse.

In the operation the gate 63 is formed with longitudinal passages 64 and transverse passages 65 and longitudinal bars 66. The transverse bars 67 are each formed with the pin 68 projecting from the outer end and with the bevelled shoulder 69 intermediate of its length.

Figures 4, 5, 6:
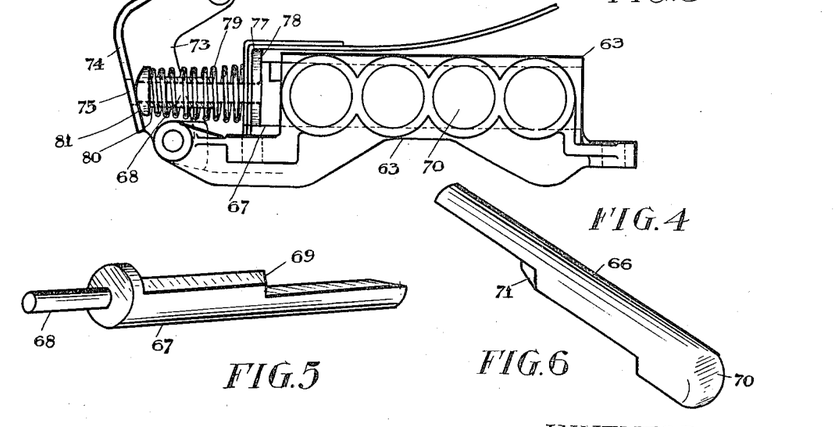
Figure 4 is an end view of the operating gate.
Figure 5 is a perspective detail of a transverse operating bar in the gate mechanism.
Figure 6 is a perspective detail of a longitudinal operating bar in the gate mechanism.

The longitudinal bars 66 are each formed with the rounded end 70 and the bevelled shoulder 71 intermediate of their length for engaging the bevelled shoulder 69, each bar being cut away suitably to fit into the other and in a sliding movement operate the transverse bar.

Figure 3:
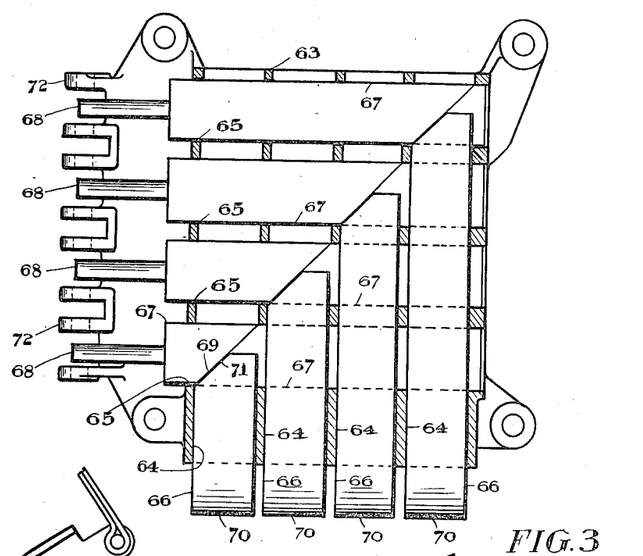
Figure 3 is a plan view of the operating gate.

The bars 66 are inserted into the longitudinal passages 64 and the transverse bars 66 in the transverse passages 65, the pins 68 projecting beyond the gate frame 63. The parallel lugs 72 in pairs project outwardly from the gate frame 63 between the pins 68 and the angle levers 73 are pivotally secured between each pair of lugs 72 and are each formed with the flanges 74 having the pin holes 75 therethrough.

The band brakes 50, 53, 54 and 55 with a suitable facing 75 are secured to the levers 73 and extend around their respective internal gears and brake rings and are brought thereunder and offset at 77 and slipped over the pins 68, the washers 78 being introduced between said offset and the ends of the transverse bars 67.

The springs 79 encircle the pins 68 and also encircle the ferrules 80 slidably mounted on said pins, said ferrules having the rounded heads 81 in each case abutting the flanges 74 of the angle levers 73.

Figure 2:
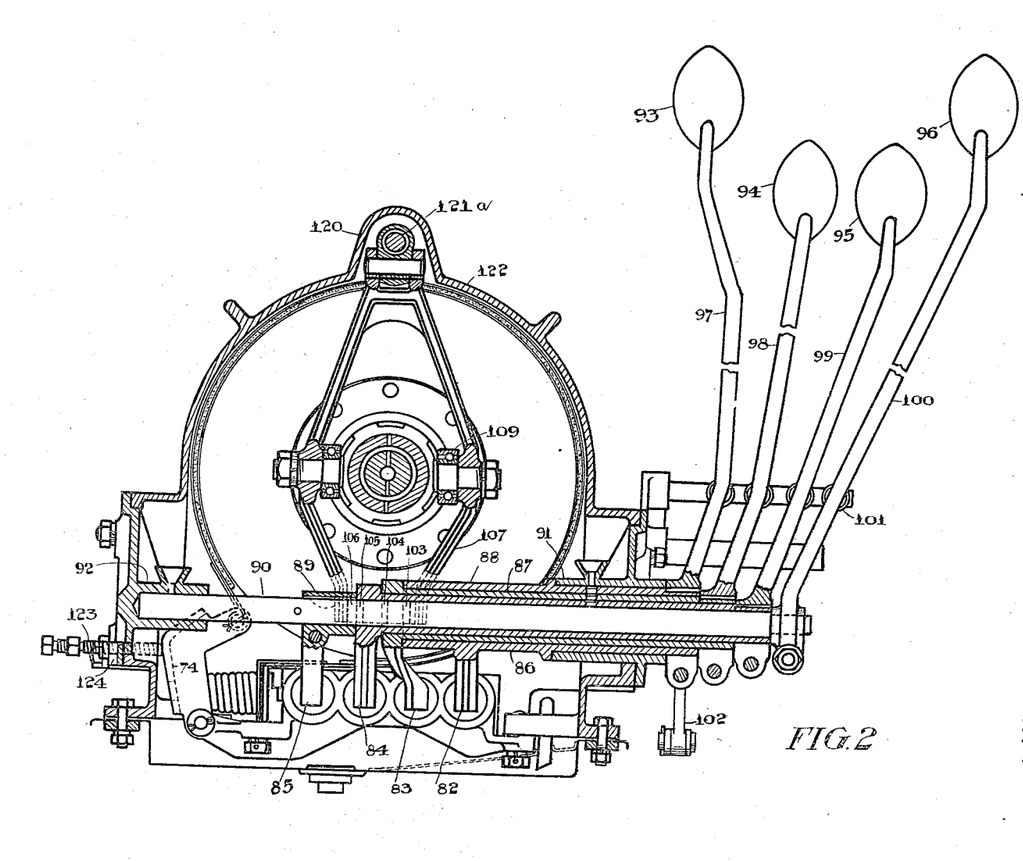
Figure 2 is a cross sectional view through the transmission case, showing the clutch at the end thereof and the various pedal rods and pedals for changing the speed, reversing and braking.

The longitudinal bars 66 are operated by the fingers 82 83, 84 and 85 and the fingers 82, 83 and 84 extend from the hollow shafts 86, 87 and 88 respectively in inner intermediate and outer arrangement and the finger 85 extends from the hub 89 fixedly mounted on the shaft 90, which is inside the inner hollow shaft and is journalled in the bearings 91 and 92.

The pedals 93, 94, 95 and 96 are secured to the shafts 86, 87, 88 and 90 respectively through corresponding pedal levers 97, 98, 99 and 100 each of said pedal levers being spring-held by the springs 101 against adjusting screw 130.

The emergency brake lever connection 102 extends from the service brake pedal mounting and operates therewith.

Each pedal lever mounting has a corresponding finger and cam 103, 104, 105 and 106. These cams are in operative engagement with the clutch operating lever 107 having the recessed lower end 108 to receive the cams and the roller centre 109 engaging the sliding collar 110 on its flange 111. The collar engages the sliding plate 28 so that the clutch is released on the operation of any one of the transverse bars 67 and similarly at the operation of the emergency brakes at the same time as the service brakes.

The pivot for the clutch operating lever 107 is inserted through the lug 119 from the block 120 into which the bolt 121ª is screw-threaded and held in by the wall of the transmission case by the lock nut 121 thereby furnishing a means of adjusting the position of the clutch operating lever so that the release of the clutch will always be assured when proper adjustment is made.

All this mechanism is enclosed in a case 122 and the adjusting screws 123 are inserted in the thickened portion 124 of the case wall and engage the flanges 74 for regulating the band clearances in relation to the clutch operation.

The case 122 joins the case 125 and is held thereto by the bolt 126. The other end of the casing 122 converges at 127 to form a bearing for the transmission shaft 1.

Figures 16, 17, 18:
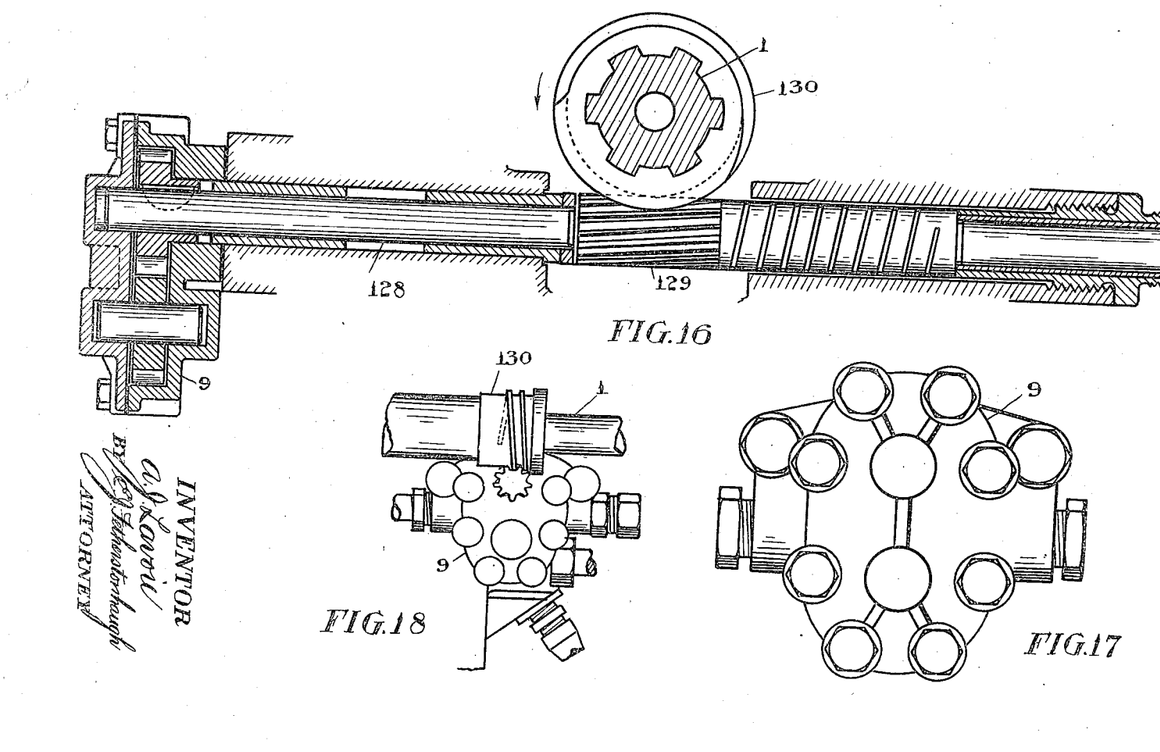
Figure 16 is an enlarged longitudinal view showing the oil pump and speedometer shaft and the engaging worm.
Figure 17 is an enlarged elevation of the oil pump.
Figure 18 is an end view of the same mechanism as illustrated in Figure 16 looking towards the pump.

The oil pump, 9 is operated by the transverse shaft 128 having the gear 129 coacting with the worm 130 on the transmission shaft 1. One end of the transverse shaft 128 is adapted to operate the speedometer.

Briefly the operation of this invention is as follows:

Before starting the engine it is well to see that the emergency brake lever is in proper position and consequently that the clutch which forms the direct connection to the transmission shaft 1 is released. In this condition of the mechanism, starting the engine will leave everything free so far as the transmission of power is concerned and though the fly wheel carries with it the sleeves and gear sleeve shaft in rotation, the transmission shaft 1 remains still. To make operating connection the service brake pedal is slightly depressed thus holding the clutch in to neutral position with the other foot the person presses any speed desired and upon release of all pedals the direct connection is made.

Take for instance the transverse bar affecting the second speed, the internal gear 4 is held by its band and the intermediate gears 37 and 38 travel around the internal gear being driven by the central gear 34 which constantly rotates through its connection with the fly wheel 3.

By slightly depressing the service brake pedal the clutch is released for coacting and other purposes and also for permitting changing from one pedal to another without making the direct connection. Pressing further in the service brake pedal the brake is applied to the extent desired.

The oiling is done throughout from the central chamber of the shaft by pressure and this reaches every part of the transmission mechanism as well as the joint to propeller shaft.

The transmission shaft is splined at its outer end and projects into one member of a universal joint connection. All parts below to benefit by oil.

What I claim is:

1. In a power transmission, a transmission shaft, a spider rigid therewith and having a plurality of shafts forming gear bearings, gears for forward and reverse movements on said shafts and non-reciprocable, a central gear shaft and gears of different diameters engaging the aforesaid gears and fixed in respect to the latter and the longitudinal position, a sleeve splined to said central gear shaft and therewith encircling said transmission shaft, internal gears engaging said forward and reverse gears, means for arresting said internal gears and a driven member operatively connecting and disconnecting said transmission shaft and sleeve.

2. In power transmission, an engine, a transmission shaft operatively connected to said engine and disconnectible therefrom, a gear sleeve shaft connecting said transmission shaft and constantly connected to said engine, a plurality of central gears rigid with said gear shaft, a plurality of internal gears having flanged webs forming journals, a brake ring having a flanged web forming a bearing for one of the aforesaid flanged webs and rigid with said transmission shaft and rotating therewith, a spider forming gear bearings, and rigid with said transmission shaft, intermediate gears journalled in said spider and operatively connecting said central and said internal gears, and brake bands suitably operated and adapted to hold one or other of said internal gears.

3. In power transmission, an engine, a transmission shaft operatively connected to said engine and disconnectible therefrom, a gear sleeve shaft connecting said transmission shaft and constantly connected to engine, a plurality of central gears rigid with said gear shaft, an internal gear encircling the larger of the central gears and supported from a hub freely rotating on said gear shaft, a brake ring for said gear supported from said hub, an internal gear of larger diameter having an extension therefrom journalled in said hub, a brake ring fast with the transmission shaft and having an extension forming an internal gear bearing, an internal gear having an extension journalled in said brake ring extension, a spider forming gear bearings and rigid with said transmission shaft intermediate gears journalled in said spider and operatively connecting said central and said internal gears, and brake bands suitably operated and adapted to hold one or other of said internal gears.

4. In power transmission, an engine, a transmission shaft operatively connected to said engine and disconnectible therefrom, a gear sleeve shaft encircling said transmission shaft and constantly connected to said engine, a plurality of central gears rigid with said gear shaft, a plurality of internal gears encircling said central gears and freely rotating on bearings suitably supported, a spider securely bolted to a flange from said transmission shaft, shafts fixedly secured in said spider and having spiral oil grooves therein, intermediate gears journalled in said spider and operatively connecting said central and said internal gears, and brake bands suitably operated and adapted to hold one or other of said internal gears.

5. In power transmission, an engine, a transmission shaft operatively connected to said engine and disconnectible therefrom, a gear sleeve shaft encircling said transmission shaft and constantly connected to said engine, a plurality of central gears rigid with said gear shaft, a plurality of internal gears encircling said central gears and freely rotating on bearings suitably supported, a spider forming gear bearings and rigid with said transmission shaft, intermediate gears journalled in said spider and operatively connecting said central and said internal gears, a service brake ring fast with said transmission shaft, brake bands for said internal gears and brake ring, pivoted dogs pivotally holding the brake bands at one end and slidable members suitably operated and drawing on the other ends of said brake bands.

6. In power transmission, an engine, a transmission shaft operatively connected to said engine and disconnectible therefrom a gear sleeve shaft encircling said transmission shaft and constantly connected to said engine, a plurality of central gears rigid with said gear shaft, a plurality of internal gears encircling said central gears and freely rotating on bearings suitably supported, a spider forming gear bearings and rigid with said transmission shaft, intermediate gears journalled in said spider and operatively connecting said central and said internal gears, a service brake ring fast with said transmission shaft, brake bands for said internal gears and brake ring, a gate having slidable slice bars therein engaging the ends of said brake bands, pivoted dogs pivotally holding the other ends of said bands and means for operating said bars.

7. In power transmission, an engine, a transmission shaft operatively connected to said engine and disconnectible therefrom, a gear sleeve shaft encircling said transmission shaft and constantly connected to said engine, a plurality of central gears rigid with said gear shaft, a plurality of internal gears encircling said central gears and freely rotating on bearings suitably supported, a spider forming gear bearings and rigid with said transmission shaft, intermediate gears journalled in said spider and operatively connecting said central and said internal gears, a service brake ring fast with said transmission shaft, brake bands for said internal gears and brake ring, a gate having bar slots therein and longitudinal and transverse bars in operative contact the latter engaging the ends of said brake bands, dogs pivoted in said gate and holding the other ends of said brake bands, springs for returning said transverse bars and means for engaging said longitudinal bars for operating said transverse bars.

8. In power transmission, an engine, a transmission shaft operatively connected to said engine and disconnectible therefrom a gear sleeve shaft encircling said transmission shaft and constantly connected to said engine, a plurality of central gears rigid with said gear shaft, a plurality of internal gears encircling said central gears and freely rotating on bearings suitably supported, a spider forming gear bearings and rigid with said transmission shaft, intermediate gears journalled in said spider and operatively connecting said central and said internal gears, a service brake ring fast with said transmission shaft, brake bands for said internal gears and brake ring, a gate having longitudinal and transverse bar slots therein and parallel lugs from one side, longitudinal bars having a bevelled shoulder intermediate of their lengths and projecting from said gate at one end, transverse bars having a meeting bevelled shoulder and projecting pins from their outer ends extending through the ends of said brake bands, pivoted dogs in said lugs, pivotally holding the other ends of said brake bands, sleeves sliding in said pins, springs encircling said pins and sliding sleeves and means for engaging the projecting ends of said longitudinal bars.

9. In power transmission, an engine, a transmission shaft operatively connected to said engine and disconnectible therefrom a gear sleeve shaft encircling said transmission shaft and constantly connected to said engine, a plurality of central gears rigid with said gear shaft, a plurality of internal gears encircling said central gears and freely rotating on bearings suitably supported, a spider forming gear bearings and rigid with said transmission shaft, intermediate gears journalled in said spider and operatively connecting said central and said internal gears, a service brake ring fast with said transmission shaft, brake bands for said internal gears and brake ring, pivoted flanged dogs engaging the ends of said brake bands, adjusting screws engaging the flanges of said dogs, a gate having sliding bars engaging the other ends of said brake bands and bars operating the aforesaid bars and means for engaging the operating bars to draw the ends and tighten the brake bands.

10. In power transmission, an engine, a transmission shaft operatively connected to said engine and disconnectible therefrom, a gear shaft encircling said transmission shaft and constantly connected to said engine, a plurality of central gears rigid with said gear shaft, a plurality of internal gears encircling said central gears and freely rotating on bearings suitably supported, a spider forming gear bearings and rigid with said transmission shaft, intermediate gears journalled in said spider and operatively connecting said central and said internal gears, a service brake ring fast with said transmission shaft, brake bands for said internal gears and brake ring, pivotal fastenings for said brake bands at one end, sliding bars engaging the other ends of said bands, bars operatively engaging said bars a gate slidably journalled and encircling sleeve shafts, fingers from the latter shafts engaging said operating bars, a releasing clutch member, cams from said gate shaft and sleeve shafts engaging said clutch member and pedal rods and pedals for operating said gate and sleeve shafts.

Signed at Montreal, Canada this 27th day of December, 1921.

ALPHONSE JOSEPH LAVOIE.